UNITED STATES PATENT OFFICE.

WILLIAM H. FINFROCK, OF CHICAGO, ILLINOIS.

ALUMINIUM-SOLDER.

No. 901,607. Specification of Letters Patent. Patented Oct. 20, 1908.

Application filed November 9, 1907. Serial No. 401,482.

*To all whom it may concern:*

Be it known that I, WILLIAM H. FINFROCK, a citizen of the United States, residing at Chicago, in the county of Cook and State of Illinois, have invented certain new and useful Improvements in Aluminium-Solder; and I do hereby declare the following to be a full, clear, and exact description of the invention, such as will enable others skilled in the art to which it appertains to make and use the same.

My invention relates to what is known as aluminium solder, that is, solder for uniting two aluminium parts or one part of aluminium with one part of another metal.

The objects I have in view are to produce an aluminium solder which is thoroughly practical and commercially valuable because it can be melted at a comparatively low temperature and when applied to make a joint is so strong that one of the parts of metal themselves will break before the solder will give way.

The invention consists of the compound of ingredients and method of preparing the same hereinafter described and specified in the claims.

The compound I employ as aluminium solder is an alloy of zinc and phosphor-tin which are preferably combined in the proportion of 4 ounces of zinc to ½ ounce of phosphor-tin. The phosphor-tin used preferably consists of five per cent. phosphorus and ninety-five per cent. tin, as this compound is easily obtainable on the market.

To prepare the solder, the zinc is first melted alone in a suitable receptacle or pot. The phosphor-tin is then dropped in and melts as soon as it comes in contact with the heated zinc. The mass is then taken off the fire and poured into molds ready for use.

While I have found that the proportion herein specified, compounded as described, gives the best results, changes may be made without departing from the spirit of my invention or sacrificing the advantages thereof. I, therefore, do not limit myself to the stated proportion nor the precise method of preparing the solder.

It has been demonstrated by very severe tests that my solder will melt readily and form a joint which is so strong that the metal itself will break before it will separate at the joint. The parts to be united are usually heated by means of a torch or blow pipe and the solder applied under said torch or blow pipe. The solder is very effective for uniting parts of aluminium, cast iron, wrought iron, brass or any other hard metals. It has a great practical advantage over all aluminium solders which contain aluminium as one of their constituent parts because it will melt at a much lower temperature.

I claim:

1. An aluminium solder consisting of a compound of zinc and phosphor-tin.

2. An aluminium solder consisting of a compound of zinc and phosphor-tin mixed in the proportion of four ounces of zinc to one-half ounce of phosphor-tin said phosphor-tin consisting of five per cent. phosphorus and ninety-five per cent. tin.

In testimony whereof, I affix my signature, in presence of two witnesses.

WILLIAM H. FINFROCK.

Witnesses:
 GEO. A. HUTCHINSON,
 FRANK J. VEIHMEYER.